United States Patent
Shaw

(10) Patent No.: US 9,057,627 B2
(45) Date of Patent: Jun. 16, 2015

(54) LOW COST FLIGHT INSTRUMENTATION SYSTEM

(75) Inventor: Robert L. Shaw, Beavercreek, OH (US)

(73) Assignee: FCI Associates, Inc., Beavercreek, OH (US)

( * ) Notice: Subject to any disclaimer, the term of this patent is extended or adjusted under 35 U.S.C. 154(b) by 1186 days.

(21) Appl. No.: 11/375,486

(22) Filed: Mar. 14, 2006

(65) Prior Publication Data

US 2006/0212182 A1 Sep. 21, 2006

Related U.S. Application Data

(60) Provisional application No. 60/661,737, filed on Mar. 15, 2005.

(51) Int. Cl.
G01C 23/00 (2006.01)
G01D 7/08 (2006.01)
B64D 43/00 (2006.01)

(52) U.S. Cl.
CPC *G01D 7/08* (2013.01); *B64D 43/00* (2013.01); *G01C 23/00* (2013.01)

(58) Field of Classification Search
CPC ............. B64C 2027/8236; B64C 2027/829; B64C 27/26; B64C 27/82
USPC ............ 701/3, 12, 1, 4, 8, 18, 301; 244/6, 48, 244/190
See application file for complete search history.

(56) References Cited

U.S. PATENT DOCUMENTS

| | | | |
|---|---|---|---|
| 4,040,005 A | 8/1977 | Melvin | |
| 4,247,843 A * | 1/1981 | Miller et al. | 340/973 |
| 4,598,582 A | 7/1986 | Henry | |
| 4,638,660 A | 1/1987 | Henry | |
| 5,103,224 A * | 4/1992 | Arad | 340/959 |
| 6,289,268 B1 * | 9/2001 | Didinsky et al. | 701/13 |
| 6,341,248 B1 | 1/2002 | Johnson | |
| 6,389,333 B1 | 5/2002 | Hansman et al. | |
| 6,405,107 B1 | 6/2002 | Derman | |
| 6,473,676 B2 | 10/2002 | Katz et al. | |
| 6,702,229 B2 | 3/2004 | Anderson et al. | |
| 6,750,788 B2 | 6/2004 | Block | |

(Continued)

FOREIGN PATENT DOCUMENTS

| | | | |
|---|---|---|---|
| JP | 62-232588 A | 10/1987 | |
| KR | 10-1995-0002909 B1 | 3/1995 | |

(Continued)

*Primary Examiner* — Redhwan K. Mawari
*Assistant Examiner* — Rodney P. King
(74) *Attorney, Agent, or Firm* — Dinsmore & Shohl LLP

(57) ABSTRACT

A device for providing flight condition information and a method of displaying such information. In one form, the device functions as a backup system to provide flight condition information in the event of partial or complete inoperability of a primary flight instrument system, or to complement such primary flight instrument system. Numerous sensors collect flight data, which can pass through devices to convert and manipulate the data to produce flight condition information that can be displayed in such a way as to reduce a pilot's cognitive workload. The information displayed includes at least flight path angle, lateral acceleration, and turn rate. Additional information that may be displayed includes heading information, as well as information relating to airspeed and altitude, among others. In another form, the device can be part of either a primary or backup system.

24 Claims, 4 Drawing Sheets

(56) References Cited

U.S. PATENT DOCUMENTS

| | | |
|---|---|---|
| 6,812,858 B2 | 11/2004 | Griffin, III |
| 6,853,315 B2 | 2/2005 | Schiller et al. |
| 6,853,947 B1 | 2/2005 | Horton |
| 6,961,643 B1 | 11/2005 | Younkin et al. |
| 7,021,587 B1 | 4/2006 | Younkin |
| 7,044,024 B1 | 5/2006 | Younkin |
| 7,295,135 B2 | 11/2007 | Younkin |
| 7,305,286 B1 | 12/2007 | Younkin et al. |
| 2001/0039467 A1* | 11/2001 | Katz et al. ............ 701/4 |
| 2002/0042673 A1* | 4/2002 | Ooga ............ 701/120 |
| 2002/0116126 A1* | 8/2002 | Lin ............ 701/214 |
| 2003/0135327 A1* | 7/2003 | Levine et al. ............ 701/220 |
| 2003/0191561 A1* | 10/2003 | Vos ............ 701/3 |
| 2005/0004723 A1* | 1/2005 | Duggan et al. ............ 701/24 |

FOREIGN PATENT DOCUMENTS

| | | |
|---|---|---|
| KR | 10-1997-00004815 B1 | 4/1997 |
| WO | WO 99/01845 A1 | 1/1999 |
| WO | WO 03/071371 A1 | 8/2003 |

* cited by examiner

LOW COST FLIGHT INSTRUMENTATION SYSTEM

This application claims the benefit of the filing date of U.S. Provisional Application No. 60/661,737, filed Mar. 15, 2005.

BACKGROUND OF THE INVENTION

The present invention relates generally to sensing and displaying aircraft operability conditions, and more particularly to an inexpensive system that can provide flight data in the event of a primary instrument failure in general aviation aircraft.

Failure of a navigation system in general aviation (GA) aircraft presents a potentially dangerous scenario for pilots operating under instrument meteorological conditions (IMC). In a typical instrument-equipped GA aircraft, the displays include an attitude indicator (AI) and heading indicator (HI) that are both powered by an on-board vacuum-driven system. In such systems, the AI provides the only direct indication of aircraft pitch and bank attitude, and serves as the focal point of the pilot's instrument scan while performing what is commonly referred to as "attitude instrument flying". An electric turn coordinator (TC, also referred to as a turn-and-slip or needle-and-ball in older installations) acts as a supporting and backup instrument for yaw rate (i.e., rotation about a vertical axis), roll rate (i.e., rotation about a longitudinal axis), and the balance of gravitational and centrifugal accelerations.

Experience shows that GA aircraft vacuum systems can be expected to fail on average about every 500 hours of operations. Many GA aircraft are not equipped with a standby vacuum system or a fault indicator to alert the pilot that the vacuum system or related equipment has suffered a failure. To make matters worse, a typical vacuum pressure gauge, which does provide an indication of an on-board vacuum failure, is usually small and placed in an obscure area of the instrument panel, well outside a pilot's normal instrument scan pattern. When the vacuum system does fail, the AI very slowly (usually imperceptibly) drifts into a false state in both pitch and bank, while "drift" errors slowly accumulate on the HI. The slow nature of the failure of these instruments almost invariably goes unnoticed by the pilot until suspicions are aroused by other factors, such as altitude/airspeed variations, wind/engine noise, or the like. Quite often the aircraft is in an unusual attitude by this time, and the confused and disoriented pilot is then called upon to recover the aircraft to a safe flight condition. This recovery must be based on the pilot's ability to integrate the indications of numerous instruments, all with serious inherent operational limitations (i.e., lags, etc.), and several of which (i.e., the gyroscopic instruments), probably unknown to the pilot, are providing misleading information. This type of "partial-panel" instrument flying is an exceptionally difficult task that few pilots perform willingly or well, and several documented studies have indicated that a significant percentage of aircraft mishaps arise from this situation, with a large majority of them proving to be fatal.

In a situation involving the loss of the AI and HI, a pilot may still glean certain information (for example, direction of turn) from the TC. Usually this instrument contains a single rate gyro mechanically linked to an indicator, for example displaying an aircraft tail-on profile against a fixed horizon line or scribe marks to indicate aircraft yaw or roll rate (in the case of a TC), or a single needle to indicate yaw rate (in the case of a turn-and-slip indicator). There is typically also an integral mechanical inclinometer (i.e., a free-moving ball in a liquid-filled tube) to indicate whether the gravitational forces are balanced by the centrifugal forces as a measure of the "quality" of the turn.

The TC is generally adequate for controlling aircraft bank angle in level flight or in turns of moderate rate. It is also useful in determining the correct direction to roll the aircraft to return to wings-level flight after entering an unusual attitude, as long as the ball in the mechanical inclinometer is near the center and the aircraft has not already rolled past 180° in one direction. Nevertheless, the TC provides no clues to aircraft pitch attitude. In situations involving loss of the AI and HI, this vital flight parameter must be inferred from observing the airspeed indicator, altimeter, and/or the vertical speed indicator (VSI). While the airspeed indicator may be correlated with known aircraft performance characteristics and current power level to gain insight into whether the nose is above or below the horizon, such method is rather imprecise. Likewise, the VSI is useful in maintaining level flight but has inherent lags that make precise control difficult. For example, while it is taught that VSI reversals indicate near-level flight in highly dynamic situations, the inherent lags and the fact that the instrument may be pegged at its upper or lower limit at the time of the reversal, reduce this technique to educated guesswork. The lower degree of lag in the altimeter, coupled with a lower likelihood of it being pegged, make it less problematic than the VSI in this regard. Despite this, the altimeter is not a panacea, as a reversal in the altimeter merely indicates near level flight, giving no direct indication of a level aircraft attitude, as angle-of-attack (AOA) variations may result from the combination of aircraft design, weight, acceleration and airspeed. Rapidly changing flight conditions (for example, acceleration and airspeed), in combination with lags inherent in other instruments such as the VSI, typically result in the pilot "chasing" the instruments during a dynamic upset recovery. The difficulty of a pilot performing flawlessly under such complex conditions is exacerbated by compelling yet erroneous pitch and bank information being provided by the AI that is situated at or near the center of the pilot's field-of-view.

Even if a pilot were to recover from the scenario mentioned above such that straight-and-level flight has been reestablished, there remains the problem of directional control. As mentioned above, a vacuum failure will also disable the gyroscopic HI. This leaves only a conventional magnetic (i.e., wet) compass for heading control, where such compass is susceptible to many degrading phenomena including deviation, variation, magnetic dip, acceleration error, northerly turning error and oscillation error. Compounding these inaccuracy problems is that the compass is frequently located well outside the normal instrument scan pattern, such as on the instrument glare shield or high on the windscreen.

A human-factors analysis of this problem clearly shows that one of the critical factors mitigating against safe partial-panel instrument flight is the necessity to modify the familiar instrument scan pattern and to correlate multiple instrument indications in order to form a clear picture of the flight situation; that is, to gain and maintain situation awareness. A contributing factor is that, in these circumstances, many instruments are being used for other than their primary intended purpose, and that they are not intuitive or optimally designed for that application. Clearly one approach to improving this situation is to "fuse" all the required critical information for partial-panel instrument flight into a single, intuitive, optimized display.

Accordingly, what is needed is a navigation system that can integrate various flight conditions (especially aircraft position information) into a single display to reduce pilot workload. What is further needed is a display that is reliable, relatively inexpensive to manufacture and easy to operate.

BRIEF SUMMARY OF THE INVENTION

These needs are met by the present invention, wherein a display and a method of providing information to a user of the display are disclosed. In accordance with a first aspect of the present invention, a backup system provides flight navigation information to a user (such as a pilot) so that, in the event of partial or complete inoperability of a primary flight instrument system, the backup system can provide flight condition information to the user in a single discrete location. In addition, the backup system can also complement the primary system when the latter is working properly. The system includes a source of electrical power, numerous flight data collection sensors and a processor that can take at least some of the sensed data and manipulate it in such a way to generate the desired flight condition information. The system also includes a display that conveys the generated flight condition information in such a way to provide a pilot with a reduced cognitive (for example, visual) workload relative to having to scan multiple displays or related indicators of flight information. The flight condition information that can be displayed includes at least the flight path angle, aircraft turn rate and lateral acceleration.

Optionally, the sensors can be used to measure one or more of aircraft speed, altitude, acceleration and change in angular position. In the present context, a change in an aircraft's angular position involves rotation about one or more of the three orthogonal aircraft body axes. The sensors configured to measure speed and altitude may be pneumatic sensors, and these pneumatic sensors may be one or more pressure sensors arranged as a sensor suite, including static and dynamic pressure sensors. The sensors used to measure an aircraft acceleration may include one or more accelerometers, where the accelerometer can be used to sense aircraft lateral acceleration. The sensors may also include an outside air temperature sensor. For example, the rate gyros may include, separately or collectively, a roll-rate gyro, a pitch-rate gyro, and a yaw-rate gyro. Each of the rate gyros can be arranged to sense rotation about one of the three orthogonal aircraft body axes. The processor may be configured as a controller, and may be coupled to one or more memory devices. Various incorporated information for manipulating the sensed data into a form suitable for display as flight navigation includes standard atmospheric data, flight test data, and data relating to various components or the aircraft as a whole. The flight condition information conveyed by the display may additionally include heading information, which can be represented in the processor by a formula derived from a measured and calculated aircraft turn rate. The flight condition information conveyed by the display further may additionally include airspeed information, altitude information, and altitude-rate information. In another option, the flight path angle may be corrected to minimize lags between displayed values and actual real-time conditions. In yet another option, the flight condition information relating to lateral acceleration can be signally coupled to processor (in the case of an electrical-based lateral acceleration display), or could be decoupled from the processor, in the case of a mechanical-based (i.e., ball suspended in a fluid) lateral acceleration display. In other words, a mechanical lateral accelerometer can be used with the present system, and such an accelerometer need not be signally coupled to the processor, instead functioning as a stand-alone (i.e., autonomous) display of lateral acceleration.

According to another aspect of the invention, a device for displaying aircraft flight condition information is disclosed. The device includes a primary display and a standby (i.e., backup) display. The primary display may include at least one of attitude indicator and heading indicator. The standby display is configured to convey at least flight path angle, turn rate and lateral acceleration information in such a way as to provide a pilot with a reduced cognitive workload in event of a failure of the primary display. Optionally, the standby display can also convey heading, altitude and airspeed information. In another option, the standby display can be coupled to the sensors, source of electrical power and processor of the previous aspect to function autonomously.

According to yet another aspect of the invention, a method of providing flight condition information to a user is disclosed. The method includes collecting flight data, manipulating at least some of the flight data such that it can be used as the flight condition information, and displaying the flight condition information to include at least flight path angle, lateral acceleration and aircraft turn rate. Examples of the collected flight data include that similar to what was discussed in conjunction with the previous aspects.

Optionally, heading, altitude and airspeed information can also be displayed. Furthermore, the displayed flight path angle, lateral acceleration and aircraft turn rate information may make up secondary flight condition information that can be viewed by a user in event of failure of an aircraft primary flight instrument, or as a complement to a primary display, regardless of whether or not the primary display is functioning properly. The secondary flight condition information may be provided by a backup system such as the one according to the previous aspect, which includes a source of electrical power, numerous sensors, a processor signally coupled to the sensors to manipulate the sensed flight condition information, and a display signally coupled to the processor. The sensors may be configured to measure at least one of an aircraft speed, altitude, acceleration and change in angular position, as previously discussed. In one particular embodiment, the sensors configured to measure one or both of the aircraft speed and altitude are made from pneumatic sensors. In addition, the sensors configured to measure at least one of the aircraft acceleration and the aircraft change in angular position comprise at least one sensor responsive to aircraft lateral acceleration and at least one sensor responsive to aircraft roll rate, yaw rate or both roll rate and yaw rate.

According to still another aspect of the invention, a method of displaying estimated aircraft heading information is disclosed. The method includes collecting and subsequently manipulating data corresponding to an aircraft yaw rate such that upon manipulation, the data is in a form that can be displayed. In addition, the method includes collecting or assuming (collectively referred to as retrieving) data corresponding to at least one of an aircraft pitch angle and an aircraft roll angle, and adjusting the aircraft yaw rate data with the retrieved aircraft pitch and/or roll angle data, and displaying the estimated aircraft heading information. An example of when the retrieval of pitch angle and roll angle information is from assumed (rather than collected) information is when a particular pitch and roll condition acts as a given For example, a level flight at a twenty degree bank angle is an assumed condition that could form the basis of retrieved information that could be used to adjust the collected (i.e., measured) yaw rate data.

Optionally, the collected aircraft pitch angle is derived from a calculated flight path angle, such as was discussed in the previous aspects. The method further includes establishing a reference heading from which any displayed value can be based, determining a rate of change of the flight path angle, determining an aircraft bank angle based on the rate of change of the flight path angle and aircraft angular rates, determining a substantially horizontal aircraft turn rate, manipulating the substantially horizontal aircraft turn rate and coordinating the reference heading with the manipulated substantially horizontal aircraft turn rate to produce the estimated aircraft heading information.

According to yet another aspect of the invention, a system configured to provide flight condition information is disclosed. The system includes a source of electrical power, a plurality of sensors configured to collect flight data, a processor signally coupled to the sensors such that it operates on at least a portion of the collected flight data to generate the flight condition information, and a display signally coupled to the processor such that the display conveys the flight condition. The flight condition information includes at least flight path angle, turn rate, and lateral acceleration. In one preferable (although not necessary) form, the system makes up a primary flight condition information system such that a redundant system (such as a vertical gyro-based system) is not necessary. The flight condition information system is incorporated into an aircraft that includes a fuselage, wheels, propulsion system and one or more wings and related flight control surfaces.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
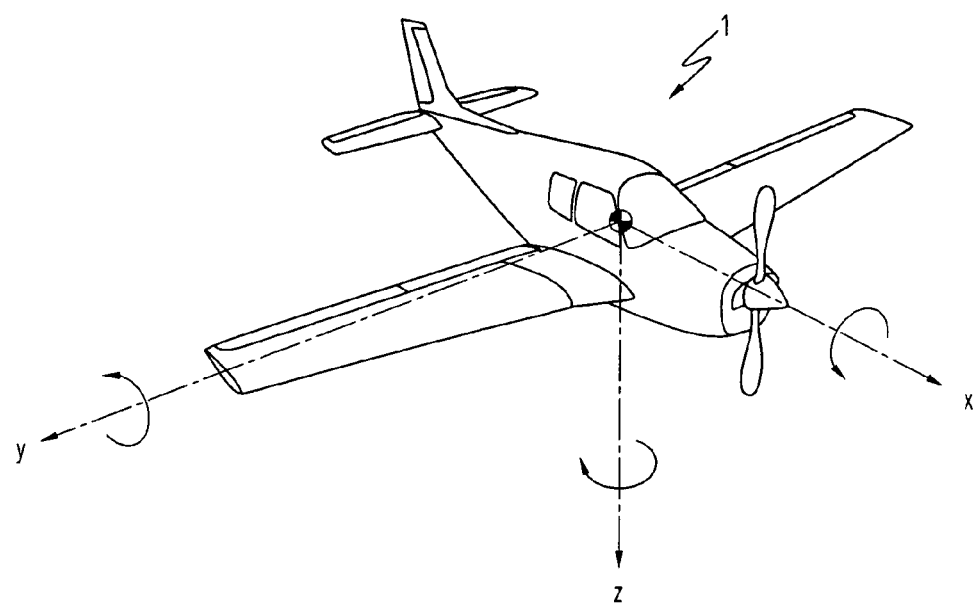
FIG. 1 shows a notional GA aircraft placed within a corresponding Cartesian coordinate system with corresponding roll, pitch and yaw rotational axes fixed to the body of the aircraft.
Figure 2A:
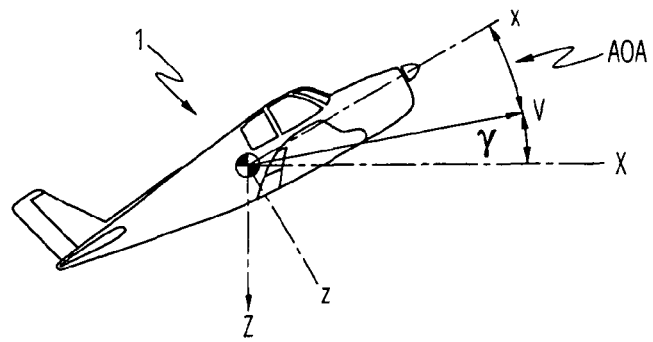
FIG. 2A shows a side elevation view of the aircraft of FIG. 1 with a notional pitch attitude, flight path angle and angle of attack.
Figure 2B:
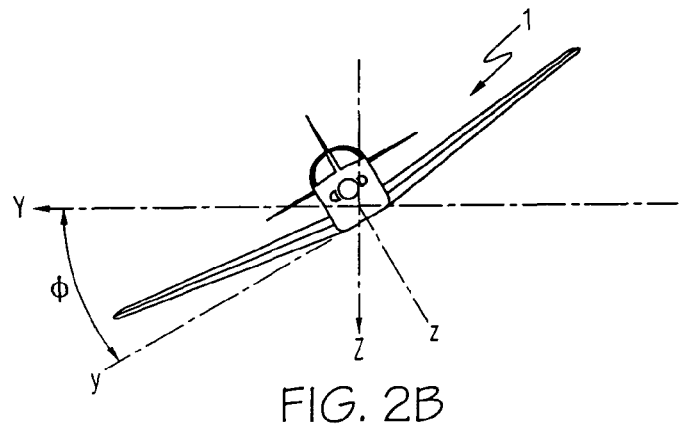
FIG. 2B shows a front elevation view of the aircraft of FIG. 1 with a notional roll angle.
Figure 2C:
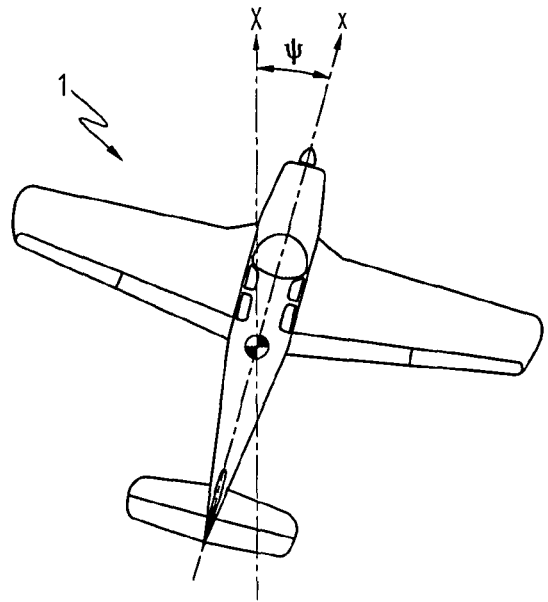
FIG. 2C shows a top view of the aircraft of FIG. 1 with a notional yaw angle.

Referring initially to FIG. 1 and FIGS. 2A through 2C, a general aviation aircraft 1 is aligned along its three principal orthogonal aircraft body axes x, y and z is shown, where the three axes generally coincide with a Cartesian coordinate system with its vertex at the aircraft's center of gravity (CG). Referring with particularity to FIG. 2A through 2C, the aircraft's pitch, roll and yaw deviations from earth-referenced inertial axes are shown. In FIG. 2A, flight path angle is designated by angle γ (gamma), which is defined as the direction of travel (shown as velocity vector V) of aircraft 1 relative to the X (i.e., horizontal) inertial axis. Because of variations in aircraft weight, maneuver, and configuration, the pitch angle of aircraft 1 (the vertical angle between the x and X axes) can be significantly different than its flight path angle γ. AOA is defined as the angle between the velocity vector and the aircraft's longitudinal axis x, projected onto the aircraft's x-z plane In FIG. 2B, the bank angle φ of aircraft 1 is a measure of how much the aircraft 1 is tilted (banked) relative to the horizontal inertial axis X. The bank angle φ is normally positive in a right bank, as shown. FIG. 2C shows yaw angle ψ, which provides an indication of aircraft heading if the X inertial axis is aligned to north.

Figure 3:
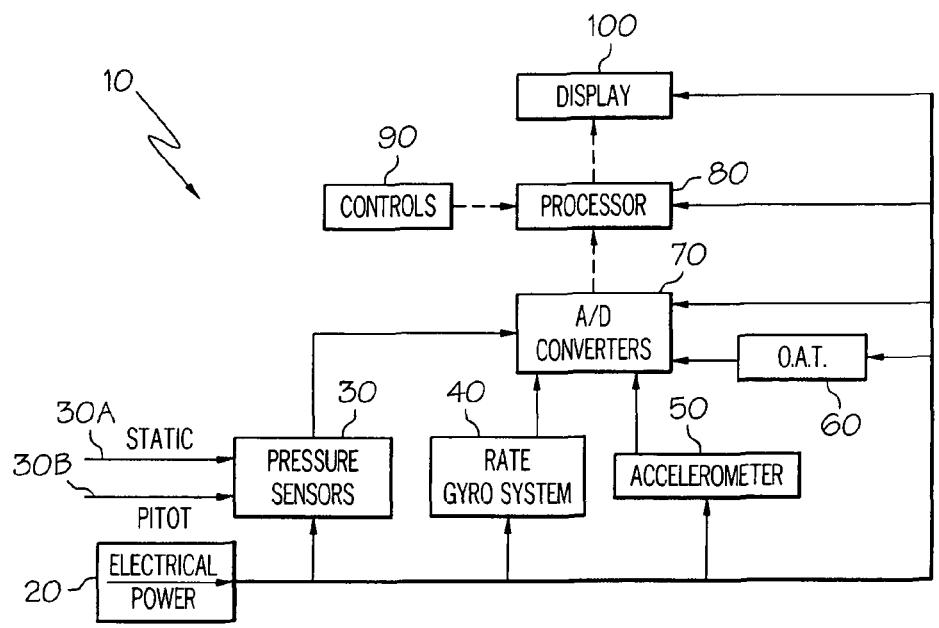
FIG. 3 shows a block diagram depicting the relationship between components of a flight instrument system according to an aspect of the present invention.

Referring next to FIG. 3, a block diagram showing the cooperation of the various components of the flight instrument system 10 are shown. System 10 includes a source of electrical power 20, two pressure sensors 30 (including a static pressure sensor 30A and a dynamic (pitot) pressure sensor 30B), a rate gyro system 40, one or more accelerometers 50, an optional outside air temperature sensor 60, one or more analog-to-digital converters 70 to receive analog signals from the pressure sensors 30, rate gyro system 40, accelerometer 50, and optional outside air temperature sensor, 60 and convert these to digital signals for a digital processor 80, which may be in the form of a programmable logic controller (PLC), or similar computer-based calculation and control device. In addition, the processor 80 (or some of its ancillary components, including the aforementioned PLC or other controller) may be configured to monitor other system parameters that could be used to provide necessary information to the pilot. In one embodiment, the processor 80 can correlate sensed signals with values represented in a lookup table or related data storage device (neither of which are shown). All control functions may be integrated into the processor 80 in the form of replaceable modules that can execute the steps of a software or firmware program. Examples of such modules may include storage modules, linkage modules, processor or logic modules, as well as others.

User-operated controls 90 provide basic input from the pilot, and can be used to vary aspects of the display. Display 100 is used to convey visual information to the pilot pertaining to the flight status of aircraft 1. As with the other components making up system 10, display 100 is electronically powered, and receives its display instructions from processor 80 based on the outputs of the several sensors (i.e., pressure 30, gyros from rate gyro system 40, accelerometer(s) 50, and optional outside air temperature 60). Typically the aircraft 1 electrical system will provide the electrical power 20 to the system, although an internal battery backup (not shown) may also be included. Power conditioning is provided as necessary for various system electronic components through DC-DC converters (not shown).

As shown in the block diagram, two low-cost pressure sensors 30A, 30B are employed. One of these sensors (30A) is open to the ambient atmosphere to provide a measure of aircraft barometric altitude. The second pressure sensor (30B) is actually a differential sensor, sensing the difference between ambient barometric pressure and dynamic pressure provided through a pitot tube, thereby providing a measure of airspeed. Such an instrument may be integrated with the aircraft's existing pitot-static system (not shown). The next sensor is a part of a three-axis orthogonal microelectromechanical (MEMS) rate gyro array system 40. The primary function of the gyro array system 40 is to sense aircraft roll, yaw, and pitch rates. It should be noted that one single-axis gyro, mounted near the aircraft's vertical plane at an angle to the vertical and longitudinal axes, is sufficient for sensing any combination of roll and yaw motions, and represents the minimum sensor set for operation of the system 10. As will be discussed in more detail below, a full set of separate orthogonal roll, yaw, and pitch gyros can be used to provide enhanced heading estimation. Alternatively, a full set of orthogonal accelerometers and at least one rate-gyro may provide similar enhanced heading estimations. Also as will be discussed in more detail below, the optional outside air temperature sensor 60 may be used for enhanced calculation of airspeeds, as well as minor improvement in the calculation of the flight path angle (FPA), described in more detail below.

Figure 4A:
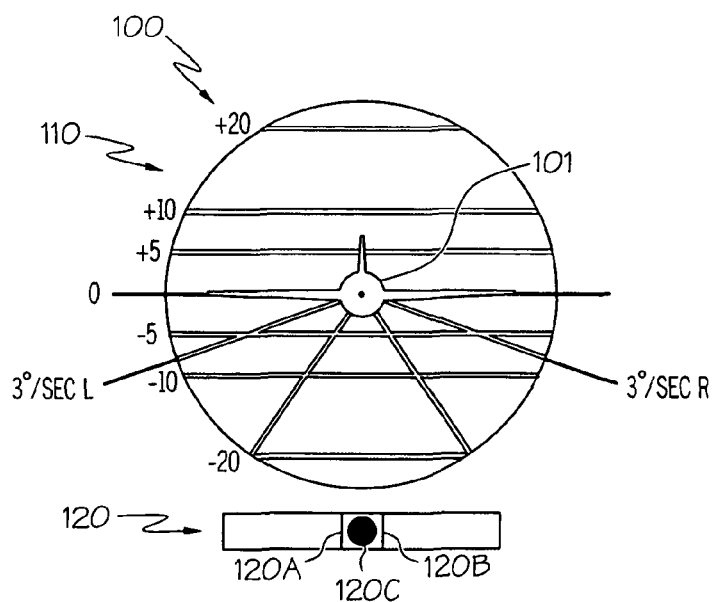
FIG. 4A shows the display of FIG. 3, indicating an aircraft in level flight with no banking or rolling.
Figure 4B:
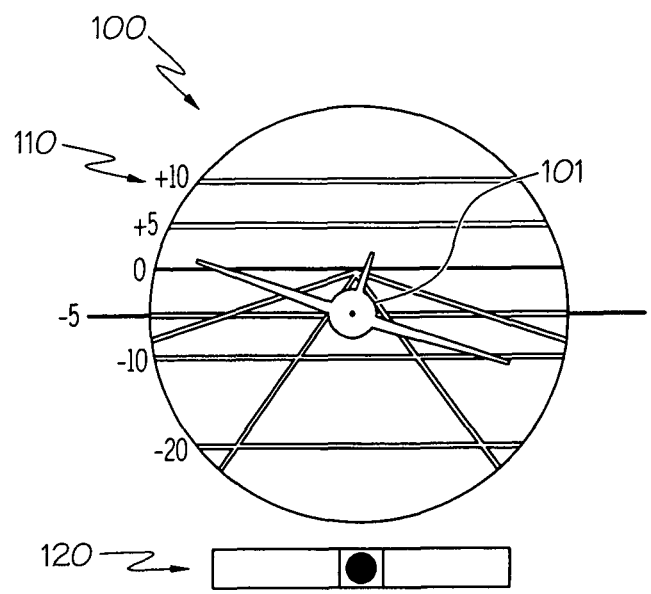
FIG. 4B shows the display of FIG. 3, indicating an aircraft in descending flight in a right turn.
Figure 5:
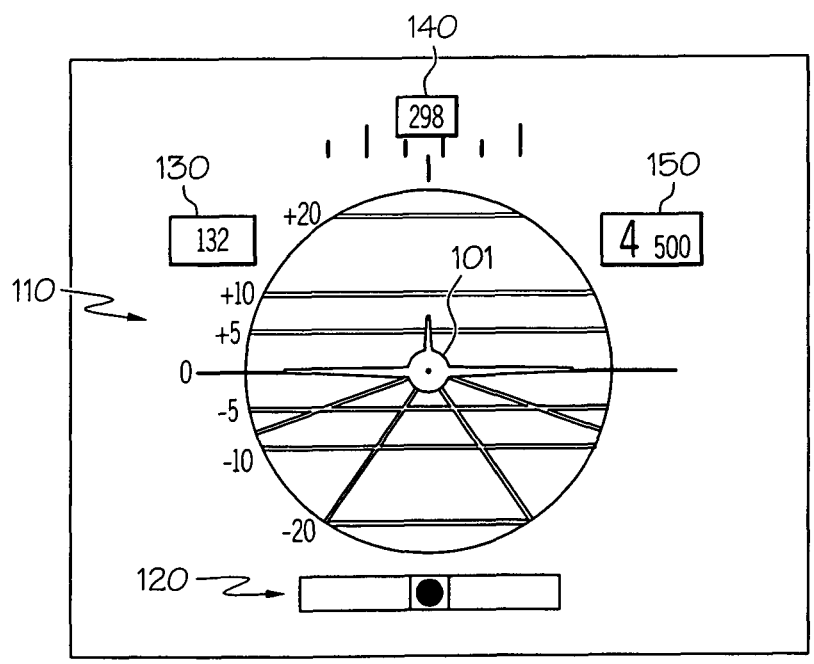
FIG. 5 shows a variation of the display of FIG. 3, indicating an aircraft in level flight with no banking or rolling, and also depicting airspeed, magnetic heading and altitude.

Referring next to FIGS. 4A, 4B and 5, display 100 is preferably a color electronic display, such as an active matrix liquid crystal display (AMLCD). Although the size of the display 100 is not critical, it will be appreciated by those skilled in the art that it may be sized to serve as a "form-fit-function" replacement for a standard TC or related instrument. For example, in the event display 100 were to be relied on as a primary display, it could be made larger. FIG. 4A depicts a notional display format for an electronic TC 110, which combines the elements a turn-rate indicator, a sideslip indicator 120 and simple flight path angle indicator (the latter labeled in degree increments above and below the horizontal). Electronic TC 110 includes pitch information that generally mimics the attitude of a conventional AI, although it displays FPA, also referred to as climb-dive angle, rather than pitch angle like the AI, and a combination of roll and yaw rates rather than bank angle like the AI. Electronic TC 110 shows a horizon line at zero degrees on the screen, a lighter background representing climb angle above the horizon (indicated in this depiction by positive numbers on the left side of the screen), and a darker background color to indicate dive angle below the horizon (indicated in this depiction by negative numbers on the left side of the screen). In one form, the lighter background may present a blue color (generally representative of the sky, for example), while the darker background may present a brown color (generally representative of the ground, for example). The colors and reference marks used for electronic TC 110 are only notional, and may be altered without deviating from the spirit of the invention. Electronic TC 110 depicts FPA using a conventional "inside-out" technique, such that the horizon moves up or down appropriately to indicate FPA while the aircraft silhouette remains stationary. This approach emulates that used by conventional AIs so that the aircraft symbol 101 positioned directly on the horizon indicates level flight, rather than level pitch attitude as on an AI. In an alternate embodiment, electronic TC 110 can be configured to depict climb-dive rate, rather than angle. In this embodiment, the position of the reference aircraft symbol remains fixed in the center of the display, while the reference background moves.

Referring with particularity to FIG. 4B, the reference aircraft symbol 101 in the center of display 100 indicates roll and yaw rates by rotating in the appropriate direction in the electronic TC 110. This "outside-in" mechanization (moving aircraft/stationary horizon) in roll has been proven to be especially intuitive for flight instruments. In the flight situation depicted in FIG. 4B, the aircraft symbol 101 indicates that aircraft 1 is turning to the right at a rate of three degrees per second with a five degree descending flight path. It should be noted that the rotation of the aircraft symbol 101 does not directly represent aircraft roll attitude (bank angle), but rather roll/yaw rate. Processor 80 incorporates an algorithm that combines the appropriately weighted outputs of both the roll-rate and yaw-rate gyros of rate gyro system 40, either or both of which may be smoothed/filtered by the use of commonly known digital smoothing techniques (not shown, but forming a portion of processor 80), to calculate rotation of the aircraft symbol 101. As the aircraft 1 begins to roll at the start of a turn, most of the rotation of the aircraft symbol 101 will be due directly to roll rate, and will nearly mirror the actual roll attitude of the aircraft 1. Once the roll angle stabilizes and the turn begins, the output of the rate gyro system 40 will provide the primary data source for positioning the aircraft symbol 101. The notional tick marks (shown, for example, as a three degree per second (i.e., two minute turn) located on either side of electronic TC 110 provide references for zero and standard turn rates. The combination of roll and yaw rate on electronic TC 110 gives the pilot a qualitative indication of the bank angle of aircraft 1.

Sideslip indicator 120, situated at the bottom of display 100, is preferably an electronic representation of the standard mechanical inclinometer (ball) found on conventional TCs, although it will be appreciated that the more conventional mechanical inclinometer can be used in the present system 10 in conjunction with display 100 to present visual indicia to the user. In the event conventional mechanical inclinometer is used in the present system 10, it is understood that the lateral accelerometer and signal communication between the inclinometer and the digital processor 80 are not required. Accelerometer 50 can be arranged as a lateral accelerometer, the output of which can be used as an input parameter for processor 80. As with other sensed data, the output from accelerometer 50 may be smoothed or filtered by the use of commonly known digital smoothing techniques. The two vertical reference lines 120A, 120B in the center of the sideslip indicator 120, set at roughly the diameter of the indicator ball 120C, provide a reference for coordinated flight. The sensitivity of the sideslip indicator 120 may be adjustable as desired through manipulation of software loaded into processor 80.

Referring again to FIG. 2A, FPA is shown by angle $\gamma$, which is the vertical angle between the horizon (i.e., the horizontal axis X) and the velocity vector V of aircraft 1. FPA is normally positive in a climb. Note that FPA is different than the aircraft attitude shown by an AI in that the latter shows where the aircraft 1 is pointing (indicated, for example, by the aircraft's longitudinal x-axis), while the former shows where aircraft 1 is going. Stated another way, the pitch of an aircraft is the vertical angle formed between the horizon and the longitudinal axis x of aircraft 1, where the longitudinal axis x is defined as a straight line through the center of gravity of the aircraft 1 parallel to the fuselage and extending out the nose and tail. The angle between the longitudinal axis x (where the aircraft is pointed) and the FPA (where the aircraft is going) projected onto the aircraft's vertical (x-z) plane is referred to as the angle-of-attack AOA.

Referring next to FIG. 5, an enhanced electronic TC 110 is shown, now including (in addition to that shown in FIGS. 4A and 4B) digital airspeed 130 on the left (reading 132 knots), a heading scale 140 on top (reading 298 degrees magnetic) and barometric altitude 150 on the right (reading 4,500 feet above sea level). These displays are notional, and it will be appreciated by those skilled in the art that other arrangements of these parameters can be used. For example, the digital format for airspeed 130 and altitude 150 were chosen only to minimize the display area; simulated analog dials or tapes (which may be preferable from a human-factors standpoint) could also be used if a large display area were employed. In another example, a depiction of vertical speed or trends in airspeed or altitude, in either digital or simulated analog format, could also be included. In yet another example, desired units for airspeed (i.e., knots, miles per hour, etc.) may be changed. In addition to airspeed 130, electronic TC 110 might also offer the option of displaying calibrated airspeed (CAS), true airspeed (TAS), or both. TAS calculations would be enhanced with inclusion of information taken from an optional outside air temperature sensor 60, while values of the measured outside air temperature may also be displayed. Both CAS and TAS are discussed in more detail below.

The chosen mechanization for the heading scale 140 is inside-out, so that the headings increase to the right. This is generally the preferred approach, consistent with most modern HIs, but opposite to the operation of the wet compass and many early directional gyros. Nevertheless, the heading scale 140 could be reversed without deviating from the spirit of the invention. Simple controls 90 (shown in block form in FIG. 3), for example, of the touch-sensitive or push-button ON/OFF, and INCREASE/DECREASE types, can be provided so that the enhanced display components may be selected, deselected, or adjusted as desired. Such controls 90 could also be used to set the altitude 150 depicted on electronic TC 110 to match the aircraft altimeter, as well as to synchronize the heading scale 140 to an on-board wet compass or an optional magnetometer. It will be appreciated that in situations where electronic TC 110 becomes the primary flight reference, having all the required flight parameters (such as, rate/direction of turn, FPA, airspeed, altitude, and heading) in a single display provides a powerful advantage for the instrument scan of a pilot.

Referring again to FIG. 3 in conjunction with FIGS. 4A, 4B and 5, electronic TC 110 displays flight information of aircraft 1 based on information generated by an embedded processor 80 based on the outputs of multiple sensors made up of pressure sensors 30, rate gyro system 40, accelerometer(s) 50 and optional outside air temperature sensor 60. At a minimum, the sensors must be capable of sensing altitude, airspeed, lateral acceleration, and yaw and roll rates, while performance may be improved by the addition of a pitch-rate gyro (as part of rate gyro system 40) and outside air temperature sensor 60. All of the sensors are placed on-board of aircraft 1, although some of the parameters, such as the altitude and speed, may be based on a Global Positioning System (GPS) or other technology. As mentioned above, the outputs from any of these sensors may be smoothed/filtered by the use of commonly known digital smoothing techniques. For example, the output of the static-pressure sensor 30A is converted to barometric altitude by the embedded processor 80, using a standard atmospheric model provided by the sensor manufacturer. In one form, the standard atmospheric model may be stored as data in a lookup table or related mass storage device, or reduced to a mathematical formula that can be embedded in the software (not shown) that is loaded onto processor 80. Improved accuracy may be obtained by incorporating a software calibration curve derived from flight-test data. The rate of change in altitude is calculated from the altitude-sensor data by software differentiation algorithms well known to those familiar with the art. These results may be smoothed/filtered to generate a climb-rate or descent-rate estimate.

Concurrent with the above calculations, an estimate of indicated airspeed (IAS) is calculated. The information is based on the output of the dynamic pressure sensor 30B by use of a standard model provided by the sensor manufacturer. Measurement accuracy may be further enhanced by correcting IAS for inherent pitot-static system errors by use of a software calibration curve derived from flight tests or from data provided by the aircraft manufacturer. As with the standard atmospheric model data discussed above, other manufacturer-provided or flight test-generated data may be stored in a lookup table or related mass storage device, or by a mathematical formula. When IAS is corrected by such data, it is referred to as calibrated airspeed (CAS), which may then lead to true airspeed (TAS), which may be calculated using the standard formula:

$$TAS = \frac{CAS}{\sqrt{\sigma}}$$

where σ is the ratio of ambient air density to sea-level air density, and may be calculated by inserting the system's best estimate of altitude into a standard atmospheric digital model. Further standard corrections may be applied to adjust this model for non-standard temperature conditions (which could be based on outputs from an optional outside air temperature sensor 60), compressibility effects, or both. Once climb/descent rate and TAS are known, FPA may be calculated by:

$$FPA = \sin^{-1}(\text{climb rate}/TAS)$$

It should be noted that FPA calculated by this method is not wind corrected, and small errors could exist when the headwind/tailwind speed is significant in relation to aircraft speed. Nevertheless, the error is negligible for small FPAs, and this issue is not expected to be a factor in the operational utility of the instrument.

Due primarily to inertial effects, there is an inherent time lag between a change in aircraft pitch angle and FPA. Since the pilot typically controls aircraft FPA indirectly by controlling pitch attitude, rather than by controlling FPA directly, this lag between aircraft attitude and FPA tends to make vertical control more difficult when performed by monitoring FPA alone. To overcome this inherent characteristic and reduce the tendency toward pilot-induced oscillation (PIO), electronic TC 110 can incorporate the values sensed by the rate gyro system 40 (which may include a pitch-rate gyro) to reduce the lag in the displayed FPA. The output from the rate gyro system 40 is converted to an estimate of aircraft pitch rate by use of a standard calibration curve provided by the sensor manufacturer. This technique modifies the displayed FPA by adding a component of pitch rate. In its simplest embodiment, pitch rate q, modified by an appropriate gain K may be added directly to the instantaneous FPA to derive a "quickened" FPA for display by electronic TC 110 such that:

$$FPA_{displayed} = FPA_{instantaneous} + Kq$$

The optimal value of K depends on numerous characteristics, including that of the aircraft 1 design, the design of the flight instrument system 10, as well as the pilot's technique. The gain K is simply a multiplier, the value of which is set to optimize pilot response while using the electronic TC 110. An optimal value may be determined by control-system theory, simulation, or flight tests. An alternative technique is to replace the information taken from the pitch-rate gyro of the rate gyro system 40 with that from a vertical accelerometer in a similar manner.

A more sophisticated quickening approach for displaying FPA is to modify the display with a function of pitch rate q that diminishes (washes out) over a short time interval roughly equivalent to the inherent delay in FPA relative to aircraft pitch-angle changes. Typically the optimal time for this washout to occur is a few seconds (for example, between approximately two an four seconds), but a suitable value for any application may be determined by control-theory calculations, simulation, or flight test. This method integrates pitch rate q over each data sampling time interval i during the preceding washout period to calculate a pitch increment $\Delta\theta_i$ during each of those time intervals. The pitch increment $\Delta\theta_i$ of each time interval i is then multiplied by a function that decreases the value of that pitch increment $\Delta\theta_i$ logarithmically with the passage of time to generate an uncorrected pitch contribution of that time interval. Additionally, each pitch contribution is multiplied by the cosine of the estimated average aircraft bank angle (discussed below) during that time interval i to generate a corrected pitch contribution. All of the corrected pitch contributions for the washout period are then summed and added to the instantaneous FPA value to calculate the FPA value to be displayed at a given time. Such a quickened FPA may be calculated by the formula:

$$FPA_{displayed} = FPA_{instantaneous} + \sum_{i=0}^{T_{washout}} [\cos(\varphi_i)\Delta\Theta_i e^{-K\Delta t_i}]$$

where $\phi_i$ is the average aircraft bank angle during time interval i, $\Delta\theta_i$ is the integral of pitch rate q during time interval i, K is a constant, $\Delta t_i$ is the elapsed time since time interval i, and $T_{washout}$ is the time period over which the quickening component is to be considered. Again, the optimal value of K depends on numerous characteristics, including that of the design of aircraft 1 and the design of the flight instrument system 10, and may be determined by control-theory calculations, simulation or flight test. In essence, this method estimates the error between the aircraft's pitch attitude at any time and its FPA at that instant, and adds this estimated error to the FPA before display. Such resulting display may be considered to be a "pseudo-pitch" display, since it tends to follow aircraft pitch-angle changes closely during maneuvering flight.

By displaying available barometric altitude and airspeed information in addition to the basic flight-path/turn-rate information, electronic TC 110 can facilitate instrument flight. It may further be desirable to adjust the displayed altitude for sea-level barometric pressure. Although a direct barometric-pressure input mode could be provided, it may be preferable (in light of the need for calibration) to allow direct adjustment of altitude displayed by electronic TC 110, which could be adjusted to match the aircraft's standard barometric altimeter, which has been adjusted for sea-level barometric pressure. Corrected altitude can then be used by the processor 80 to provide more accurate calculations of TAS and FPA.

In addition to air-data parameters, the provision of separate roll-rate, yaw-rate, and pitch-rate gyros in the electronic TC 110 allows estimation of aircraft bank angle and display of a surrogate heading indication. A means of adjusting displayed aircraft heading to match the wet compass or an optional magnetometer is provided, as is currently the practice with most vacuum-driven HIs. In its simplest embodiment, aircraft heading can be updated from a known value by reference to the output of a yaw-rate gyro in rate gyro system 40 alone. In this embodiment, yaw rate is integrated digitally by software algorithms well known to those skilled in the art to calculate an estimate of heading change. Since yaw rate sensed by the rate gyro system 40 is referenced to the aircraft 1, while heading change is reference to the earth, accuracy may be improved by providing a correction for aircraft roll and/or pitch angles by use of equations well known by those skilled in the art. The estimate of FPA derived by the flight instrument system 10 may be used as a surrogate for aircraft pitch attitude, and the assumption of a typical bank angle for turns provides for some improvement in the estimate of heading change. If further improvement of heading accuracy is desired, more sophisticated techniques may provide further enhancement to heading accuracy.

For example, if the assumption is made that AOA of aircraft 1 is zero and unchanging, a relationship exists among the aircraft angular rates, FPA ($\gamma$), the rate of change in FPA ($\dot{\gamma}$) and turn rate ($\dot{\Psi}$). These assumptions are not typically in great error during mild aircraft maneuvering. The current embodiment of the flight instrument system 10, which may include rate gyros for all three planes, makes it possible to exploit this relationship to derive estimates of aircraft bank angle and turn rate. The difficulty with estimating horizontal turn rate using only a rate gyro is the absence of a vertical-horizontal reference. Under conventional systems, the usual way to get such information is through an expensive, failure-prone vertical gyro, which significantly adds to the cost of an HI display. The present invention overcomes this difficulty by allowing for a simple, inexpensive way to estimate aircraft bank angle. The relationship above essentially uses $\dot{\gamma}$ as this vertical-horizontal reference. This is possible since FPA and $\dot{\gamma}$ always lie in the vertical plane. The value of $\dot{\gamma}$ may be calculated by digitally differentiating the estimate of FPA by software algorithms well known to those familiar with the art. Under these conditions, aircraft bank (i.e., roll) angle $\phi$ may be estimated by the following algorithm:

If $r \geq 0$, then $$\sin(\phi) = (-r\dot{\gamma} + q\sqrt{r^2+q^2-\dot{\gamma}^2})/(r^2+q^2)$$

If $r < 0$, then $$\sin(\phi) = (-r\dot{\gamma} - q\sqrt{r^2+q^2-\dot{\gamma}^2})/(r^2+q^2)$$

where q is the previously-discussed aircraft pitch rate, positive nose-up (derived from a pitch-rate gyro), r is the aircraft yaw rate, positive nose-right (derived from a yaw-rate gyro), $\gamma$ is the previously-discussed FPA, positive nose-up, calculated by the air-data system or by other means, $\dot{\gamma}$ is the previously-discussed rate of change in FPA, positive for increasing FPA (calculated by digitally differentiating $\gamma$), and $\phi$ is the previously-discussed aircraft bank angle, positive right-wing down. Once $\sin(\phi)$ is known, $\cos(\phi)$ can be easily determined from the trigonometric identity:

$$\cos(\phi) = \sqrt{1-\sin^2(\phi)}$$

such that aircraft turn rate in the horizontal plane can be estimated as:

$$\dot{\Psi} = [q\sin(\phi) + r\cos(\phi)]/\cos(\gamma).$$

Once the horizontal turn rate $\dot{\Psi}$ is estimated, this value may be digitally integrated by algorithms well known to those skilled in the art to derive an estimate of current aircraft heading, based on some known reference (i.e., starting) heading, as with standard HIs. A similar technique that exploits the relationship among aircraft accelerations, FPA, and the second derivative of altitude may be substituted without deviating from the spirit of the invention. In this alternate case, the second derivative of altitude provides the vertical reference. In either case, the use of digital differentiation may result in considerable "noise" in the resulting values of $\dot{\gamma}$ or the second derivative of altitude. Considerable reduction in this noise, and greatly improved turn-rate estimates, may be provided by digital filtering techniques, such as the Kalman filtering technique that is well-known to those skilled in the art. Further improvements may be obtained by using quickened values of $\gamma$ for deriving $\dot{\gamma}$ in a manner generally similar to that of determining a quickened FPA (discussed above).

In summary, the present system 10 can employ an airspeed sensor, one or more rate gyros, and an altitude sensor to estimate the heading of aircraft 1. In situations where either an HI or vacuum system failure occurs, the aircraft 1 heading estimated by any of the techniques described above is vastly superior to reliance on a wet compass alone. In addition, the present system 10 is less costly than systems that rely upon external sources of information, such as the aforementioned GPS. Flight instrument system 10 is further equipped with a means for the pilot to adjust the displayed heading periodically to a known or estimated heading to compensate for any system heading drift that may occur over time. As an option, a magnetometer may be coupled to the flight instrument system 10 to provide an input for magnetic heading, where the magnetometer estimates magnetic heading by sensing the earth's magnetic field and applying a calibration algorithm provided by the magnetometer manufacturer. Since a magnetometer without attitude compensation is subject to similar errors as those of the wet compass, a means must be developed to ensure that magnetometer corrections are applied to the estimate of heading only when the aircraft is near straight-and-level flight. This may be accomplished by providing the pilot with a synchronizing control to align the displayed heading with the magnetometer heading estimate. A software algorithm may also be included that restricts magnetometer corrections to the displayed heading only when both the gyro-derived and the magnetometer-derived heading estimates are changing only at very slow rates. During these periods, the gyro-derived heading estimate is corrected toward the magnetometer-derived estimate at a fixed rate. This technique results in automatic correction of the displayed heading by the magnetometer during periods of near straight-and-level flight, and more accurate gyro-based heading estimates during maneuvering flight.

While certain representative embodiments and details have been shown for purposes of illustrating the invention, it will be apparent to those skilled in the art that various changes may be made without departing from the scope of the invention, which is defined in the appended claims.

What is claimed is:

1. A backup display system for use in a general aviation aircraft, said backup display system configured to provide flight condition information in the event of partial or complete inoperability of a primary flight instrument system on said general aviation aircraft, said backup display system comprising:
    a source of electrical power situated on said general aviation aircraft;
    a plurality of sensors situated on said general aviation aircraft and configured to collect flight data;
    a processor situated on said general aviation aircraft and cooperative with said source of electrical power and signally coupled to said plurality of sensors such that said processor operates on said collected flight data to generate at least a portion of said flight condition information without need for input from neither a global positioning system nor an inertial navigation system to said display system, said generated flight condition information comprising at least flight path angle, turn rate, and lateral acceleration; and
    a display situated on said general aviation aircraft and signally coupled to said processor such that said display conveys said generated flight condition information in such a way as to provide a pilot with a reduced cognitive workload, wherein said flight condition information conveyed by said display further comprises bank angle information that is estimated in said processor according to the following formula:

$$\sin((\phi))=(-r\dot{\gamma}+q\sqrt{r^2+q^2-\dot{\gamma}^2})/(r^2+q^2)$$

for situations where $r \geq 0$,
and by the following formula:

$$\sin(\phi)=-r\dot{\gamma}-q\sqrt{r^2+q^2-\dot{\gamma}^2})/(r^2+q^2)$$

for situations where $r<0$,
where $\phi$ represents said bank angle information, $\gamma$ represents said flight path angle, $\dot{\gamma}$ is the rate of change in flight path angle, q represents aircraft pitch rate and r represents aircraft yaw rate, $$\sin((\phi))=(-r\dot{\gamma}+q\sqrt{r^2+q^2-\dot{\gamma}^2})/(r^2+q^2)$$

for situations where $r \geq 0$,
and by the following formula:

$$\sin(\phi)=-r\dot{\gamma}-q\sqrt{r^2+q^2-\dot{\gamma}^2})/(r^2+q^2)$$

for situations where $r<0$,
where $\phi$ represents said bank angle information, $\gamma$ represents said flight path angle, $\dot{\gamma}$ is the rate of change in flight path angle, q represents aircraft pitch rate and r represents aircraft yaw rate.

2. The system of claim 1, wherein said plurality of sensors comprise sensors configured to measure at least one of an aircraft speed, an aircraft altitude, an aircraft acceleration and an aircraft change in angular position.

3. The system of claim 2, wherein said sensors configured to measure at least one of an aircraft speed and an aircraft altitude comprise pneumatic pressure sensors.

4. The system of claim 3, wherein said pneumatic pressure sensors further comprise a static pressure sensor and a dynamic pressure sensor.

5. The system of claim 2, wherein said sensors configured to measure an aircraft acceleration comprise at least one lateral accelerometer.

6. The system of claim 1, wherein said plurality of sensors further comprise an outside air temperature sensor.

7. The system of claim 2, wherein said sensors configured to measure said aircraft change in angular position comprises a rate gyro.

8. The system of claim 7, wherein said rate gyro comprises at least a yaw-rate gyro.

9. The system of claim 8, wherein said rate gyro further comprises a roll-rate gyro.

10. The system of claim 9, wherein said rate gyro further comprises a pitch-rate gyro such that each of said rate gyros sense rotation about one of the three orthogonal aircraft body axes.

11. The system of claim 1, wherein said processor is further configured to operate on data selected from the group consisting of standard atmospheric data, flight test data and component data.

12. The system of claim 1, wherein said flight condition information conveyed by said display further comprises heading information.

13. The system of claim 12, wherein said heading information is represented in said processor by a formula derived from a measured and calculated substantially horizontal plane aircraft turn rate that is substantially determined according to the following equation:

$$\dot{\Psi}=[q\sin(\phi)+r\cos(\phi)]/\cos(\gamma),$$

where $\phi$ represents aircraft bank angle, $\gamma$ represents said flight path angle, q represents aircraft pitch rate and r represents aircraft yaw rate.

14. The system of claim 1, wherein said flight condition information conveyed by said display further comprises airspeed information and altitude information.

15. The system of claim 1, wherein said flight path angle conveyed to said display is corrected according to the following formula:

$$FPA_{displayed} = FPA_{instantaneous} + Kq,$$

where q represents aircraft pitch rate and K represents gain.

16. The system of claim 1, wherein said flight path angle conveyed to said display is corrected according to the following formula:

$$FPA_{displayed} = FPA_{instantaneous} + \sum_{i=0}^{T_{washout}} [\cos(\varphi_i) \Delta \Theta_i e^{-K \Delta t_i}]$$

where $\phi_i$ is the average aircraft bank angle during time interval i, $\Delta\Theta_i$ is the integral of pitch rate q during time interval i, K is a constant, $\Delta t_i$ is the elapsed time since time interval i, and $T_{washout}$ is the time period over which the quickening component is to be considered.

17. A device for displaying general aviation aircraft flight condition information, said device comprising:
a primary display situated on said general aviation aircraft; and
a standby display situated on said general aviation aircraft and independently operable of said primary display, said standby display configured to convey, without a need for input from either a global positioning system or an inertial navigation system to said standby display, generated flight condition information comprising at least flight path angle, lateral acceleration, and turn rate information of said general aviation aircraft in such a way as to provide a pilot with a reduced cognitive workload in event of a failure of said primary display or another component providing said aircraft flight condition information to said primary display, wherein generated flight condition information is generated by processing flight data collected from a plurality of sensors, wherein said flight condition information conveyed by said display further comprises bank angle information that is estimated in said processor according to the following formula:

$$\sin((\phi)) = (-r\dot{\gamma} + q\sqrt{r^2 + q^2 - \dot{\gamma}^2})/(r^2 + q^2)$$

for situations where r≥0,
and by the following formula:

$$\sin(\phi) = -r\dot{\gamma} - q\sqrt{r^2 + q^2 - \dot{\gamma}^2}/(r^2 + q^2)$$

for situations where r<0,
where $\phi$ represents said bank angle information, γ represents said flight path angle, $\dot{\gamma}$ is the rate of change in flight path angle, q represents aircraft pitch rate and r represents aircraft yaw rate.

18. A method of providing flight condition information to a user aboard a general aviation aircraft, said method comprising:

collecting a plurality of flight data pertaining to said general aviation aircraft using at least one of a rate gyro, barometer and magnetomoter and using input from neither a global positioning system nor an inertial navigation system;
manipulating at least a portion of said plurality of flight data to generate said flight condition information; and
displaying said generated flight condition information to a user operating said general aviation aircraft, said displayed generated flight condition information comprising at least flight path angle, lateral acceleration and aircraft turn rate, wherein said flight condition information further comprises bank angle information that is estimated according to the following formula:

$$\sin((\phi)) = (-r\dot{\gamma} + q\sqrt{r^2 + q^2 - \dot{\gamma}^2})/(r^2 + q^2)$$

for situations where r≥0,
and by the following formula:

$$\sin(\phi) = -r\dot{\gamma} - q\sqrt{r^2 + q^2 - \dot{\gamma}^2}/(r^2 + q^2)$$

for situations where r<0,
where $\phi$ represents said bank angle information, γ represents said flight path angle, $\dot{\gamma}$ is the rate of change in flight path angle, q represents aircraft pitch rate and r represents aircraft yaw rate.

19. The method of claim 18, wherein said displayed flight path angle, lateral acceleration and aircraft turn rate information comprise secondary flight condition information.

20. The method of claim 18, wherein said displaying said generated flight condition information further comprises displaying at least one of heading, altitude and airspeed information.

21. The method of claim 19, wherein said secondary flight condition information is provided by a backup system comprising:
a source of electrical power;
a plurality of sensors configured to sense said secondary flight condition information;
a processor signally coupled to said plurality of sensors to manipulate said sensed secondary flight condition information; and
a display signally coupled to said processor.

22. The method of claim 21, wherein said plurality of sensors comprise sensors configured to measure at least one of an aircraft speed, an aircraft altitude, an aircraft acceleration and an aircraft change in angular position.

23. The method of claim 21, wherein said sensors configured to measure at least one of said aircraft speed and said aircraft altitude comprise pneumatic pressure sensors.

24. The method of claim 23, wherein said sensors configured to measure at least one of said aircraft acceleration and said aircraft change in angular position comprise at least one sensor responsive to aircraft lateral acceleration and at least one sensor responsive to aircraft roll rate, yaw rate or both roll rate and yaw rate.

* * * * *

UNITED STATES PATENT AND TRADEMARK OFFICE
CERTIFICATE OF CORRECTION

PATENT NO.         : 9,057,627 B2
APPLICATION NO.    : 11/375486
DATED              : June 16, 2015
INVENTOR(S)        : Robert L. Shaw It is certified that error appears in the above-identified patent and that said Letters Patent is hereby corrected as shown below:

Please insert the following section and paragraph on page 1 line 6 of the specification before the BACKGROUND OF THE INVENTION Section:

--STATEMENT REGARDING FEDERALLY SPONSORED RESEARCH OR DEVELOPMENT

This invention was supported by the government under Contract No. NNL04AA02C awarded by NASA. The government has certain rights in the invention.--

Signed and Sealed this
Twentieth Day of October, 2015

Michelle K. Lee
*Director of the United States Patent and Trademark Office*

UNITED STATES PATENT AND TRADEMARK OFFICE
CERTIFICATE OF CORRECTION

PATENT NO. : 9,057,627 B2  
APPLICATION NO. : 11/375486  
DATED : June 16, 2015  
INVENTOR(S) : Robert L. Shaw Page 1 of 1

It is certified that error appears in the above-identified patent and that said Letters Patent is hereby corrected as shown below:

Please insert the following section and paragraph on page 1 line 6 of the specification before the BACKGROUND OF THE INVENTION Section:

--STATEMENT REGARDING FEDERALLY SPONSORED RESEARCH OR DEVELOPMENT

This invention was supported by the government under Contract No. NNL05AA02C awarded by NASA. The government has certain rights in the invention.--

This certificate supersedes the Certificate of Correction issued October 20, 2015.

Signed and Sealed this  
First Day of March, 2016

Michelle K. Lee  
*Director of the United States Patent and Trademark Office*